(12) United States Patent
Rudisill et al.

(10) Patent No.: US 6,773,531 B2
(45) Date of Patent: Aug. 10, 2004

(54) PROCESS AND APPARATUS FOR MAKING MULTI-LAYERED, MULTI-COMPONENT FILAMENTS

(75) Inventors: Edgar N. Rudisill, Nashville, TN (US); Vishal Bansal, Midlothian, VA (US); Michael C. Davis, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/681,682

(22) Filed: May 21, 2001

(65) Prior Publication Data

US 2002/0170661 A1 Nov. 21, 2002

(51) Int. Cl.⁷ ................................................. D04H 3/16
(52) U.S. Cl. ........................................ 156/167; 156/433
(58) Field of Search ............................ 264/172.14, 169, 264/171.1; 156/167, 433; 425/131.5, 72.2, 403, 66, 81.1; 428/198

(56) References Cited

U.S. PATENT DOCUMENTS

| | | | |
|---|---|---|---|
| 3,716,317 A | * | 2/1973 | Williams et al. ....... 264/172.14 |
| 3,841,953 A | | 10/1974 | Kohkamp et al. |
| 3,860,383 A | | 1/1975 | Sirevicius |
| 3,981,650 A | | 9/1976 | Page |
| 4,043,739 A | | 8/1977 | Appel |
| 4,164,437 A | * | 8/1979 | Henne et al. ................ 156/167 |
| 4,285,655 A | | 8/1981 | Matsubara |
| 4,547,420 A | | 10/1985 | Krueger et al. |
| 4,889,476 A | * | 12/1989 | Buehning ..................... 264/12 |
| 5,162,074 A | * | 11/1992 | Hills ............................. 216/83 |
| 5,620,644 A | * | 4/1997 | Hodan et al. ............... 264/169 |
| 5,728,407 A | | 3/1998 | Matsui |
| 5,866,050 A | * | 2/1999 | Krauss et al. ............ 264/176.1 |
| 6,057,256 A | | 5/2000 | Krueger et al. |
| 6,120,276 A | | 9/2000 | Balk |
| 6,182,732 B1 | * | 2/2001 | Allen .......................... 156/441 |
| 6,402,870 B1 | * | 6/2002 | Groten et al. ............... 156/167 |
| 2002/0034909 A1 | | 3/2002 | Bansal et al. |
| 2002/0125601 A1 | | 9/2002 | Allen |

FOREIGN PATENT DOCUMENTS

| | | |
|---|---|---|
| GB | 2121423 A | 12/1983 |
| JP | 2289107 A | 11/1990 |
| JP | 2[1990]-289107 | 11/1990 |

* cited by examiner

Primary Examiner—Richard Crispino
Assistant Examiner—Barbara J Musser

(57) ABSTRACT

The present invention is directed to a process for forming a plurality of multi-layered filaments from multiple thermoplastic synthetic polymers and an apparatus containing a melt spinning beam comprising an orthogonal beam having disposed within said beam multiple polymer inlet passages each communicating with separate multiple coat hanger distribution manifolds, separate filters connected downstream of each coat hanger distribution manifold, a spinneret connected downstream of said filters with separate polymer flow passages communicating with separate exit orifices for spinning of said multi-layered filaments.

7 Claims, 1 Drawing Sheet

PROCESS AND APPARATUS FOR MAKING MULTI-LAYERED, MULTI-COMPONENT FILAMENTS

BACKGROUND OF INVENTION

This invention relates to a process and an apparatus for producing melt spun multi-layered cross section multi-component filaments. These filaments can be collected and processed into nonwoven webs for use in filters, apparel, wipes, and hygiene products.

In a melt spinning process, thermoplastic synthetic polymers are melted and forced through orifices of a spinneret to form filaments. These filaments can be drawn or attenuated via air jets or mechanical means and collected on a moving porous surface to produce a random laydown of filaments or nonwoven web. The web can be bonded together to maintain its integrity. Also, in a melt blowing process, air jets can be added at the end of the spinneret to provide a very rapid drawing process providing very small diameter filaments.

In order to produce uniform filaments from a row of spinneret orifices, the polymer of each filament should be subjected to as nearly as possible the same heat history and residence time in the spinning apparatus. This can be accomplished using a polymer distribution manifold, which makes molten polymer with a longer travel distance move more quickly than molten polymer with a shorter travel distance. An example of a distribution manifold is a coat hanger (indicative of the general shape of the manifold) which can be found in U.S. Pat. Nos. 3,860,383; 4,043,739; 4,285,655; 5,728,407; and 6,120,276.

Bicomponent filaments which are made from two different polymers can also be melt spun. The separate molten polymer flow streams can be combined into layered polymer flow streams to make filaments with side-by-side cross sections in which filament portions each have distinct polymer components that extend for a significant portion of the length of each filament. An example of this in a meltblown process is U.S. Pat. No. 6,057,256. It is known, when making side-by-side cross section filaments, to combine polymer flow streams prior to using a coat hanger. Unfortunately, this eliminates the capacity for downstream filtering as filtering of the bicomponent melt stream would cause mixing of the layered polymer streams. It is also known, to use a coat hanger for each polymer flow stream and then to feed the polymer flow streams to a split hole die before being combined. Unfortunately, this split hole die can produce non-uniform filaments.

In systems where the polymers are not filtered, there are a significant number of spinneret orifices that plug during the start-up of the die and during operation, as the orifices are not protected from particles that come through the melt system. Essentially all melt processes will form particles that are large enough to plug the spin orifice. The source of these particles can be degraded polymer, gels, agglomerates, contaminants, etc. For most processes the typical number of plugged holes will start at 10–15% and will continue to increase during the run.

In the prior art processes, when the polymers are combined before the melts exit the die, an interface exists between the two polymer melts. This interface is not directly controlled and can be influenced by many factors in the process. Two examples of the significant problems that can occur due to the lack of control of this interface are 1) when using two similar polymers the interface may start to diffuse as the polymers start to mix and thus the fiber will be more a melt blend fiber versus a bicomponent fiber; and 2) if the polymers have a significant difference in melt viscosity, it is possible the higher viscosity polymer will start to fill a disproportionate amount of the space available to the melt which will likely result in a mismatch in the speed of the two melts as they are exiting the die, as the polymer melts can slide past each other along the interface which will likely cause spinning problems. There is a need for a melt spinning apparatus and process for making uniform multi-layered cross section filaments which allow for downstream filtering, the use of polymers with different melt viscosities, and minimizing the contact time for undesirable mixing between molten polymers.

SUMMARY OF INVENTION

In a first embodiment, the present invention is directed to a process for preparing a plurality of multi-layered filaments from multiple thermoplastic synthetic polymers comprising separately melting and extruding multiple thermoplastic synthetic polymers into separate molten polymer flow streams, distributing said separate molten polymer flow streams into separate planar molten polymer flow streams, then filtering said separate planar molten polymer flow streams, and feeding said separate planar molten polymer flow streams into a spinneret comprising a plurality of separate polymer flow passages, wherein each planar molten polymer flow stream is fed to a separate series of said polymer flow passages communicating with spinneret exit orifices, which are aligned such that multiple molten polymer flow streams emerging from said exit orifices are directed into contact with one another to form multi-layered filaments.

Another embodiment of the present invention is an apparatus for carrying out the process described above, comprising multiple extruders for separately melting and extruding multiple thermoplastic synthetic polymers into molten polymer flow streams, separate distribution manifolds downstream of and communicating with said extruders for distributing said separate molten polymer flow streams into separate planar molten polymer flow streams, separate filters downstream of and communicating with said distribution manifolds for filtering said separate planar molten polymer flow streams, and a spinneret, downstream of and communicating with said filters, comprising a plurality of separate polymer flow passages for transporting each of said separate planar molten polymer flow streams to a plurality of spinneret exit orifices, said passages being aligned such that separate molten polymer flow streams emerging from the exit orifices come into contact with one another to form multi-layered filaments.

A further embodiment of the present invention is directed to a melt spinning beam for use in the process and apparatus described above which comprises multiple polymer inlet passages each communicating with separate multiple coat hanger distribution manifolds, separate filters downstream of and communicating with each coat hanger distribution manifold, and a spinneret downstream of and communicating with said filters, said spinneret having a plurality of separate polymer flow passages communicating with exit orifices for spinning of said multi-layered filaments.

DETAILED DESCRIPTION

Figure 1:
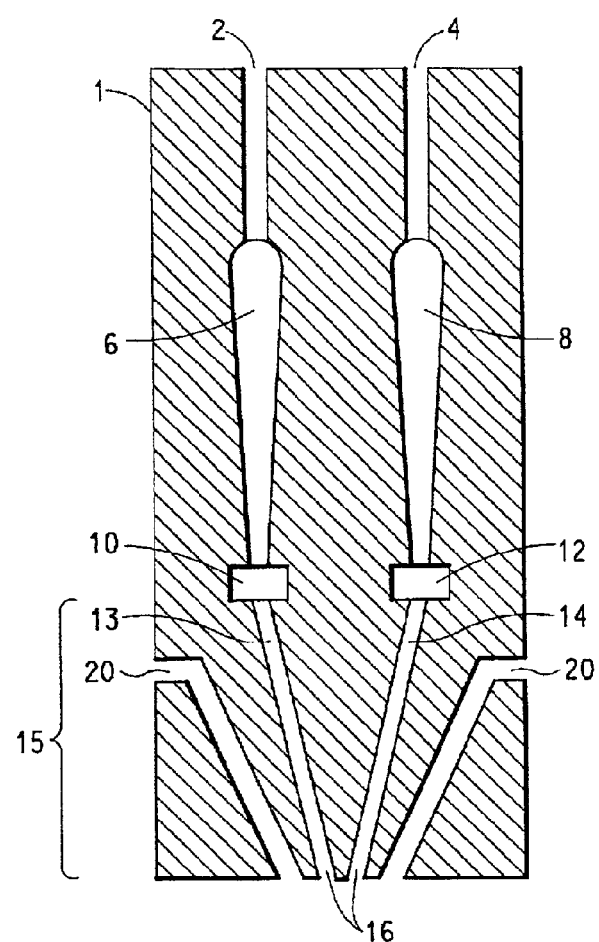
FIG. 1 is a schematic diagram of a transverse cross section of a melt spinning beam for producing side-by-side cross section bicomponent filaments according to the present invention.

The term multi-layered filaments as used herein means filaments with a first polymer layer extending longitudinally along the fiber in contact with a second polymer layer extending longitudinally along the fiber with the second polymer optionally in contact with one or more other polymer layers.

The term multiple thermoplastic synthetic polymers as used herein means more than one distinct or dissimilar synthetically prepared heat processible polymer. This includes, but is not limited to, polyolefins, polyesters and polyamides. It also includes homopolymers, copolymers and blends of polymers.

The term molten polymer flow streams as used herein means a polymer heated above its melting point that can flow through a spinning apparatus.

The term planar molten polymer flow streams as used herein means a molten polymer flow stream that generally has a high width-to-height ratio cross section.

The term distribution manifold as used herein means a device for spreading a polymer flow stream into a generally high width-to-height ratio cross section preferably with the polymer all along the flow stream cross section being subjected to nearly the same heat history.

The use of the terms separate or separately herein is generally intended to indicate the independent transport, processing or other such function of the multiple polymer components which are used according to the present invention. For example, the phrase a plurality of separate polymer flow passages is intended to indicate that a plurality of flow passages exist for separate transport of each different polymer to be used in the process.

The present invention is directed to melt spinning uniform multi-layered cross section multi-component filaments. These filaments can be collected on a forming screen and bonded together to produce a nonwoven web. This web can be used, for example, in filters, apparel, wipes, and hygiene products.

According to the invention, multiple thermoplastic synthetic polymers are separately melted into molten polymer flow streams, distributed into planar molten polymer flow streams, filtered, fed into a plurality of separate spinneret orifices positioned in such a way that the polymers for each filament are aligned so that after the polymer emerges from the orifice the polymers come into contact with one another producing the multi-layered cross section filaments. Optionally, as the molten polymer flow streams emerge from the spinneret orifices, the filament forming multilayered molten polymer flow stream can be cooled and attenuated with high speed fluid such as air from fluid jets to form very small diameter filaments as in melt blowing.

In multiple component filaments, the multiple thermoplastic synthetic polymers comprise at least two dissimilar polymers, which can be either chemically or physically dissimilar. The polymers can include polyolefins, polyesters and polyamides, and can be homopolymers, co-polymers or blends of polymers.

The polymers are melted into separate molten polymer flow streams using conventional means, such as extruders, and forced through separate distribution manifolds to produce separate planar molten polymer flow streams. The distribution manifolds arrange the molten polymer flow streams into long thin planes of molten polymer, wherein the polymer all along the plane has nearly the same heat history and residence time. It is optimal for the molten polymer stream to have as much as possible the same heat history and residence time in order to minimize degradation of the polymer contacting the manifold walls, which tends to form solidified particles which can plug the spinneret orifices downstream, and/or form less uniform spun filaments. A common distribution manifold is a coat hanger manifold, which is named as such due to its general resemblance (in longitudinal cross section) in form to a coat hanger. Due to the long, thin form of the coat hanger distribution manifold, heat from the walls of the melt spinning beam is transferred through the molten polymer almost instantaneously, thus minimizing heat gradients within the spin beam and reducing non-uniform heating of the polymer.

Likewise, due to the shape of the coat hanger distribution manifold, molten polymer which has a longer distance to travel within the manifold travels at a faster rate than that which has a shorter distance to travel. Accordingly, upon proper design of the coat hanger distribution manifold, all molten polymer within the manifold will have nearly identical residence time.

In spite of the use of coat hanger distribution manifolds, the molten polymer within the spinning beam is invariably somewhat degraded at the interface with the walls of the spinning beam, both within the coat hanger manifold and in the inlet passages to the spinning beam. Accordingly, in the present invention, the planar molten polymer flow streams are individually filtered prior to being combined, but downstream of the coat hanger distribution manifolds, greatly reducing or eliminating unwanted particulate passing into the spinneret which might plug the spinneret exit orifices. In this manner, each of the multiple molten polymer streams can be filtered, without causing upsets in flow after combination of the streams, which would adversely affect the layered natures of the streams and therefore the resulting filaments.

The filtered planar molten polymer flow streams are spun through a plurality of spinneret orifices positioned in such a way that the polymers for each filament are aligned, so that after the polymer filaments emerge from the orifice the separate polymer filaments come into contact with one another producing the multi-layered cross section filaments desired. For example, the separate molten polymer flow passages, 13 and 14, may be angled toward each other within the spinneret, 15, as shown in FIG. 1, such that the separate polymer filaments exiting the spinneret orifices, 16, are directed into contact with each other and thereby coalesce. Alternatively, the separate polymer flow passages can be arranged within the spinneret to be essentially parallel and in close enough proximity such that the different polymer filaments exiting the spinneret orifices are forced into contact with each other, for instance by the force of the fluid exiting fluid jets, 20, described in more detail below.

The layering of the polymers can be in any order and can be repeated as often as desired. Each layer contacts the surface of the filaments and extends for a significant portion of the length of the filaments.

In the simplest example, the filaments containing only two dissimilar polymers to prepare filaments of the invention are called bicomponent filaments. Also, in the instance of two layers, the filaments are called side-by-side cross section filaments. In another embodiment of the invention, the spinning beam may contain more than two flow pathways for more than two molten polymer streams. Thus, if three-component filaments are desired, the spinning beam would be configured to have three separate polymer inlet passages, three separate coat hanger distribution manifolds and three separate filters, which all feed into a spinneret, wherein the three separate molten polymer streams are separately extruded into a plurality of separate molten polymer passages, a series of such passages for each of the three molten polymers, all of which feed the spinneret exit orifices downstream to form three-component filaments as they exit the spinning beam. The skilled artisan will recognize that any number of separate flowpaths can be formed within the spinning beam, so as to form multiple-component filaments.

The invention can be described with reference to a specific example of preparing side-by-side cross section bicomponent filaments according to the spinning apparatus of FIG. 1.

FIG. 1 is a transverse cross sectional view of a two-component orthogonal spinning beam 1, which extends in the longitudinal direction, i.e. perpendicular to the plane of the page, for several meters. Two different thermoplastic synthetic polymers are separately melted in separate extruders (not shown) and fed into the spinning beam through inlet passages 2 and 4. The molten polymers are transported to two coat hanger distribution manifolds 6 and 8, which direct the molten polymer flow streams into two planar molten polymer flow streams. By careful selection of manifold geometry, all of the polymer has nearly the same temperature, viscosity and residence time in the manifold along the length of the plane of the molten polymer flow stream. The planar molten polymer flow streams are individually filtered through filters 10 and 12, which extend the length of the melt spinning beam. The separate planar molten polymer flow streams are fed through separate molten polymer passages, 13 and 14, within the spinneret 15. The integrity and separate identities of the separate polymer flow streams are maintained while the flow streams are fed to a plurality of spinneret orifices 16. After exiting the spinneret orifices, the individual polymer filaments so formed coalesce into bi-layered molten polymer filaments.

Optionally, in a melt-blowing process, as the separate molten polymer filaments emerge from the spinneret orifices and coalesce, the bi-layered molten polymer filaments so formed can be cooled and attenuated with high speed fluid, such as air, exiting jets 20 to form very small diameter filaments.

EXAMPLES

The example below describes the preparation of webs made from meltblown bicomponent fibers according to the process described above with reference to the apparatus of FIG. 1.

EXAMPLE 1

A meltblown bicomponent web was made with a polyethylene component and a poly(ethylene terephthalate) component. The polyethylene component was made from linear low density polyethylene with a melt index of 135 g/10 minutes (measured according to ASTM D-1238) available from Equistar as GA594. The polyester component was made from poly(ethylene terephthalate) with a reported intrinsic viscosity of 0.53 available from DuPont as Crystar® polyester (Merge 4449). The polyethylene polymer was heated to 260° C. and the polyester polymer was heated to 305° C. in separate extruders. The two polymers were separately extruded and metered to two independent coat hanger type polymer distributors. The planar melt streams exiting each distributor were filtered independently and extruded through a bicomponent meltblowing die that has 2 linear sets of independent holes arranged such that a spin orifice for each polymer is located in close proximity which results in a linear array of pairs of spin orifices. The pairs were arranged such that a line that passes through the center of both orifices in the pair is perpendicular to the direction of the linear array of hole pairs, with the center point between the 2 holes in the pair being located on the vertex of the die tip. The die was heated to 305° C. The die had 645 pairs of capillary openings arranged in a 54.6 cm line. The polyethylene polymer was spun at a polymer throughput rate of 0.16 g/hole/min. The polyester polymer was spun at a polymer throughput rate of 0.64 g/hole/min. Attenuating air was heated to a temperature of 305° C. and supplied at a pressure of 5.5 psi through two 1.5 mm wide air channels. The two air channels ran the length of the 54.6 cm line of capillary openings, with one channel on each side of the line of capillaries set back 1.5 mm from the capillary openings. The polyethylene was supplied to the spin pack at a rate of 6.2 kg/hr and the polyester was supplied to the spin pack at a rate of 24.8 kg/hr. A bicomponent meltblown web was produced that was 20 weight percent polyethylene and 80 weight percent polyester. The filaments were collected at a die to collector distance of 20.3 cm on a moving forming screen to produce a meltblown web. The meltblown web was collected on a roll. The meltblown web had a basis weight of 51 g/m Filtering of the planar molten polymer flowstreams resulted in the virtual elimination of plugging of the spinneret exit orifices, thus enhancing uniformity of the nonwoven webs formed, and extending the up-time of the spinning system.

What is claimed is:

1. A process for preparing a plurality of multi-layered filaments from multiple thermoplastic synthetic polymers comprising:

separately melting and extruding multiple thermoplastic synthetic polymers into separate molten polymer flow streams;

passing each of said separate molten polymer flow streams into separate coat hanger manifolds to form a separate planar molten polymer flow stream of each of said polymers;

then passing said separate planar molten polymer flow streams through separate filters to filter said planar molten polymer flow streams;

feeding said separate planar molten polymer flow streams into a spinneret comprising a plurality of separate polymer flow passages, wherein each planar molten polymer flow stream is fed to a separate series of said polymer flow passages communicating with spinneret exit orifices, which passages are aligned such that multiple molten polymer flow streams emerging from said exit orifices are directed into contact with one another to form multi-layered filaments; and attenuating said multi-layered filaments so formed with fluid exiting fluid jets positioned adjacent said plurality of spinneret exit orifices.

2. The process of claim 1, wherein the number of multiple thermoplastic synthetic polymers is two.

3. The process of claim 1, wherein the numb r of multipl thermoplastic synthetic polymers is greater than two.

4. An apparatus for melt blowing a plurality of multi-layered filaments from multiple thermoplastic synthetic polymers comprising:

multiple extruders for separately melting and extruding multiple thermoplastic synthetic polymers into molten polymer flow streams; and a melt blowing beam comprising:
- separate coat hanger distribution manifolds downstream of and communicating with said extruders;
- separate filters downstream of and communicating with said coat hanger distribution manifolds, said filters extending essentially the length of said melt blowing beam;
- a spinneret, downstream of and communicating with said filters, comprising a plurality of separate polymer flow passages for distributing each of said separate planar molten polymer flow streams to a plurality of spinneret exit orifices, said passages being aligned such that separate molten polymer flow streams emerging from the exit orifices come into contact with one another to form multi-layered filaments; and
- fluid lets positioned adjacent said spinneret exit orifices to provide fluid for attenuating said multi-layered filaments.

5. The apparatus of claim 4, which is configured for two thermoplastic synthetic polymers.

6. The apparatus of claim 4, which is configured for more than two thermoplastic synthetic polymers.

7. A meltblowing beam for forming a plurality of multi-layered meltblown filaments from multiple thermoplastic synthetic polymers which comprises multiple polymer inlet passages each communicating with separate multiple coat hanger distribution manifolds, separate filters downstream of and communicating with each coat hanger distribution manifold, a spinneret downstream of and communicating with said filters, said spinneret having a plurality of separate polymer flow passages communicating with exit orifices for spinning of said multi-layered filaments, and fluid lets positioned adjacent said spinneret exit orifices to provide fluid for attenuating said multi-layered filaments.

* * * * *

UNITED STATES PATENT AND TRADEMARK OFFICE
CERTIFICATE OF CORRECTION

PATENT NO. : 6,773,531 B2
DATED : August 10, 2004
INVENTOR(S) : Rudisill Edgar N., Bansal Vishal and Davis Michael C.

It is certified that error appears in the above-identified patent and that said Letters Patent is hereby corrected as shown below:

Column 6,
Line 60, "numb r of multipl" should be -- number of multiple --.

Column 7,
Line 17, "fluid lets" should be -- fluid jets --.

Column 8,
Line 15, "fluid lets" should be -- fluid jets --.

Signed and Sealed this

Seventh Day of December, 2004

JON W. DUDAS
*Director of the United States Patent and Trademark Office*